US009568692B2

(12) United States Patent
Annis et al.

(10) Patent No.: US 9,568,692 B2
(45) Date of Patent: Feb. 14, 2017

(54) OPTO-ELECTRIC MODULE FOR BACKPLANE CONNECTOR

(71) Applicant: Tyco Electronics Corporation, Berwyn, PA (US)

(72) Inventors: Kyle Gary Annis, Hummelstown, PA (US); James Leo Barry, Harrisburg, PA (US); David James Fabian, Mount Joy, PA (US); Benjamin Michael Grab, Annville, PA (US); James Patrick Mosier, Palmyra, PA (US); Douglas Harold Rohde, Hershey, PA (US); Rodney Shawn Smith, Bolling Springs, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 0 days.

(21) Appl. No.: 14/665,504

(22) Filed: Mar. 23, 2015

(65) Prior Publication Data

US 2016/0282575 A1    Sep. 29, 2016

(51) Int. Cl.
*G02B 6/42* (2006.01)

(52) U.S. Cl.
CPC .......... *G02B 6/4249* (2013.01); *G02B 6/4257* (2013.01)

(58) Field of Classification Search
CPC ......... G02B 6/30; G02B 6/381; G02B 6/4201; G02B 6/4249; G02B 6/4251; G02B 6/4256; G02B 6/4257; G02B 6/426; G02B 6/4261; G02B 6/428; G02B 6/4281; G02B 6/43
See application file for complete search history.

(56) References Cited

U.S. PATENT DOCUMENTS 7,149,400 B2 * 12/2006 Lange ................. G02B 6/3897
                                                         385/137
9,195,014 B2 * 11/2015 Moriyama ........... G02B 6/3885

* cited by examiner

*Primary Examiner* — John M Bedtelyon

(57) ABSTRACT

An opto-electric (OE) module having a front and back orientation and comprising a connector having a front end configured to mate with a connector, an optical interconnect comprising an optical conduit with first and second ends, the first end being terminated by at least one first ferrule, the first ferrule being disposed in the connector in a non-biased state, and the second end being optically coupled to at least one opto-electric device (OED), wherein the optical interconnect is not configured to bend to accommodate distance variations between said first ferrule and said OED, a cover being attached to the connector and having an interior, a circuit board disposed in the interior and having an electrical interface configured to connect to a daughter card, and the opto-electric device (OED) attached to the circuit board and optically connected to the second end.

23 Claims, 4 Drawing Sheets

OPTO-ELECTRIC MODULE FOR BACKPLANE CONNECTOR

FIELD OF INVENTION

The subject matter herein relates generally to backplane opto-electrical (O/E) systems, and, more specifically, to O/E modules for backplane connector systems.

BACKGROUND

Computing system designers face significant design challenges for embedded computing technologies, including, for example, reliability of operation, harsh operating environments, system interoperability, and data and system security. To meet these challenges, VMEbus International Trade Association (VITA), a standards-development body, has worked to define and develop key computer bus, board, and system specifications, such as VMEbus, PCI Mezzanine Card (PMC), VXS, VPX, and FMC, among others. Of particular interest herein is VPX, formerly known as VITA 46, which is an ANSI standard (ANSI/VITA 46.0-2007). The ANSI/VITA VPX standard defines ruggedized backplane/ module card system configurations for embedded computing. Within VPX, the VITA 66 standards (hereby incorporated by reference) define the optical interfaces between the backplane and the daughter cards (e.g. VITA 66.1 connectors).

The daughter cards increasingly employ mid-board fiber optic transceivers to support data rates at or above 10 gbps. In a typical VPX system, the daughter card is populated with mid-board transceivers connected to daughter card connectors, such as VITA 66.1 connectors, using an optical fiber cable assembly. These mid-board optics modules are then connected with a fiber (typically ribbon fiber) to a VITA 66.x or other card edge connector. These cable assemblies are typically bowed/deflected/bent or contain service loops to accommodate manufacturing tolerances in the cable assemblies and to facilitate installation. Additionally, the cables are bowed to accommodate the axial displacement of the ferrule in the connector during mating. In other words, as the ferrule in the VITA 66.1 connector is pushed back during mating, the cable must be configured to bend or displace to accommodate its movement.

Applicants have identified a number of shortcomings of such a configuration. For example, if the bow in the cable assembly is excessive, the cable may interfere with the adjacent daughter cards and/or other cables on the card. Furthermore, VPX systems are typically used in aircraft and military equipment in which the environments tend to be severe (for example, high-vibration), yet reliability is critical. Vibration-induced wear, abrasion, and over bending of the cable assembles reduces their reliability. Such a configuration also does not lend itself to repair. Specifically, rework and reparability of the current state of the art is problematic as the routing of the fiber ribbons and the mid-board transceivers are integral to the daughter card assembly and are not easily replaced when failures occur in the fiber optic system.

It should be noted that the aforementioned problems are not limited to VPX-designs, but often present themselves whenever an island-mount EO module is connected to card edge connectors for blind mating.

Applicants recognized the need to eliminate the complexities of fiber cable routing for island-mount EO modules in daughter card design, not only to simplify manufacturing and increase reliability, but also to conserve valuable space on the daughter card. Applicants also recognize the need for a blindmateable EO module. Additionally, Applicants recognize that a suitable ruggedized backplane card system should comprise line replaceable units (LRUs) to facilitate repair. The present invention fulfills these needs among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

This disclosure relates to an O/E module for a daughter card of a backplane connector system that eliminates the fiber cable routing complexity of prior art VPX daughter cards. Specifically, rather than having island-mount opto-electro devices (OEDs), which require complex routing of ribbon cable to optically couple them to optical connectors at the card's edge, the present invention modularizes the O/E functionality, the optical connector and fiber interconnection to provide a compact module for disposition at the card's edge. This modularity is facilitated, at least in part, by the elimination of a biased ferrule in the optical connector on the daughter card. Specifically, the biased ferrule is moved from the card connector of the daughter card to the mating backplane connector so that the axial displacement of the ferrule in the daughter card connector is eliminated, thus essentially eliminating fiber bow/deflection/bending in the module.

Such a configuration has significant benefits. For example, by locating the OED close to the connector in the module, the optical connection between the connector and the OED is shortened, thus simplifying the interconnection and saving valuable real estate on the daughter card. As discussed above, the short optical interconnect is facilitated, at least in part, by eliminating the biased ferrule, which, in turn, eliminates the need to accommodate ferrule displacement and fiber bending. Because there is no need to facilitate fiber bending, the optical interconnect can be short and essentially straight between the connector and the OED. (The axial displacement in fiber deflection is now on the backplane, where it can be managed better.) In one embodiment, the module is sized to fit within space constraints of industry standard VPX systems. Additionally, the fixed optical interconnect between the connector and the OED allows the use of optical flex, rather than twisted ribbon fiber. Since optical flex will be contained within the module as opposed to being routed as part of the daughter card assembly, tighter tolerance control of the optical links will be feasible to insure repeatable optical conduit management inside the module.

The packaging of the OED, optical connector and optical interconnection as part of a single assembly enables the module also to be a line replaceable unit (LRU) that can be readily interchanged in the event of failure. From a system failure standpoint, the modular approach also makes it easier for system designers to approximate mean time between failure (MTBF) of the system.

Accordingly, one aspect of the invention is a daughter card module for optically coupling with a backplane connector in which the module comprises a non-biased ferrule. In One embodiment, the module holds the non-biased ferrule in a simple clam-shell configuration. Specifically, the opto-electric (O/E) module of this embodiment has a front and back orientation and comprises: (a) a connector having a front end configured to mate with a mating connector, and a cavity rearward of the front end adapted to receive a first ferrule, an opening above the cavity to provide access for the first ferrule to the cavity, and a first interface on the periphery of the cavity to receive a second interface of a cover; (b) an optical interconnect with first and second ends, the first end being terminated by the first ferrule, the first ferrule being disposed in the cavity in a non-biased state, and the second end being optically coupled to an opto-electric device (OED); (c) the cover having the second interface and an interior, the second interface coordinating with the first interface such that the cover covers the cavity, thereby holding the first ferrule in the cavity between the cover and the connector; (d) a circuit board disposed in the interior and having an electrical interface configured to connect to a second circuit board; and (e) the OED attached to the circuit board and optically connected to the second ferrule.

In another embodiment, the O/E module comprises an optical interconnect which is essentially straight between the connector and the OED of the module to reduce the footprint of the module and to simplify the routing of the interconnect. In this embodiment, the opto-electric (O/E) module has a front and back orientation and comprises: (a) a connector having a front end configured to mate with a connector; (b) an optical interconnect comprising an optical conduit with first and second ends, the first end being terminated by a first ferrule, the first ferrule being disposed in the connector in a non-biased state, and the second end being optically coupled to an opto-electric device (OED), the optical conduit being essentially straight between first and second ends; (c) a cover being attached to the connector and having an interior; (d) a circuit board disposed in the interior and having an electrical interface configured to connect to a daughter card; and (e) the opto-electric device (OED) attached to the circuit board and optically connected to the second end.

Another aspect of the invention is a backplane system in which the biasing of the ferrule occurs in backplane connector rather than the daughter card connector. In one embodiment, the system comprises (a) a backplane comprising at least one backplane connector, the backplane connector comprising a backplane ferrule and a spring to bias the backplane ferrule forward; and (b) at least one daughter card comprising at least one opto-electric (OE) module having a front and back orientation and comprising at least: (i) a connector having a front end configured to mate with the backplane connector; (ii) an optical interconnect comprising an optical conduit with first and second ends, the first end being terminated by a first ferrule, the first ferrule being disposed in the connector in a non-biased state, and the second end being optically coupled to an opto-electric device (OED), the optical conduit being essentially straight between first and second ends; (iii) a cover being attached to the connector and having an interior; (iv) a circuit board disposed in the interior and having an electrical interface configured to connect to the daughter card; and (v) the opto-electric device (OED) attached to the circuit board and optically connected to the second end.

DETAILED DESCRIPTION

Figure 1:
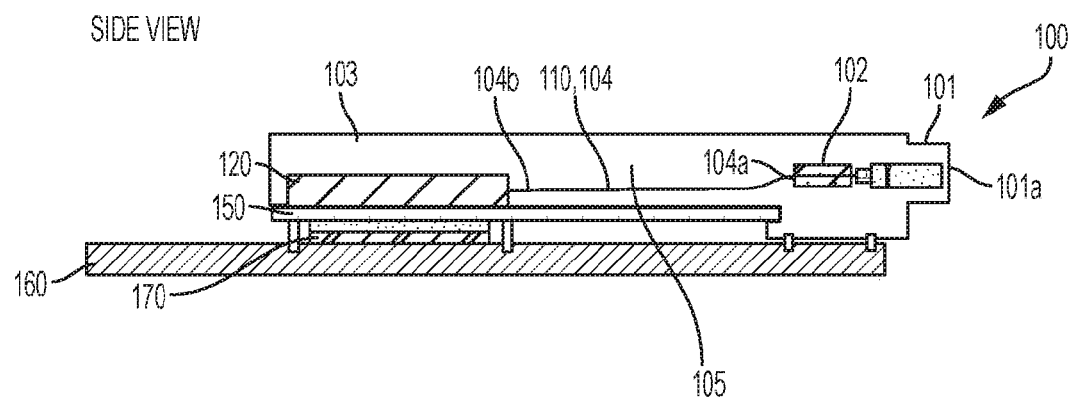
FIG. 1 a shows a side cross section schematic of one embodiment of the module of the present invention.
Figure 2:
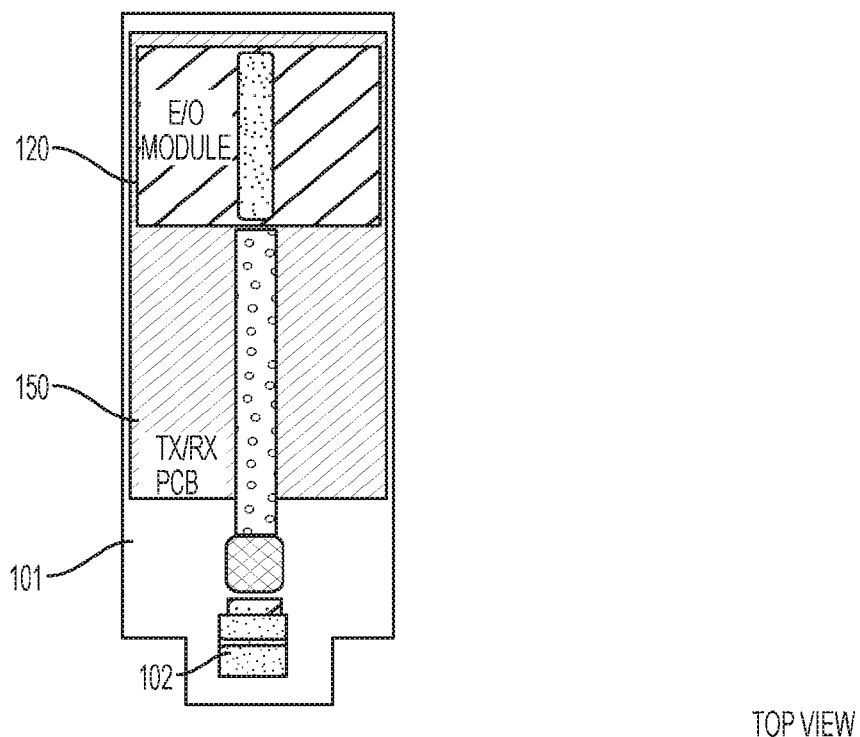
FIG. 2 shows a top view cross section schematic of the module of FIG. 1.
Figure 3:
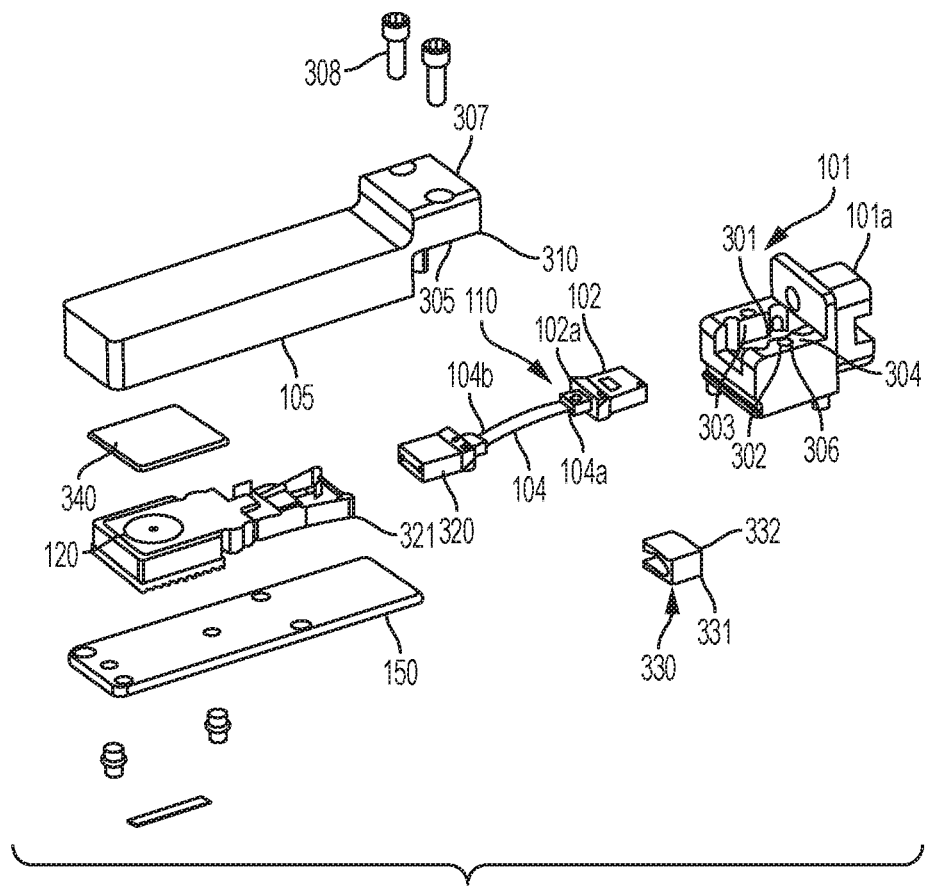
FIG. 3 shows an exploded view of the module of FIG. 1.

Referring to FIGS. 1-3, one embodiment of the opto-electric (OE) module 100 of the present invention is shown. The module 100 has a front and back orientation and is suitable for mounting on a daughter card 160. The module comprises a connector 101 having a front end 101a configured to mate with a backplane connector 401 on a backplane 402 (see FIG. 4), and a cavity 301 rearward of the front end to receive a first ferrule 102. In one embodiment, the connector physically/dimensionally complies with VITA 66, and more particularly, VITA 66.4, to ensure dimensional compatibility with existing VPX systems and the ability to be dropped into a VITA defined slot. The cavity 301 is open at the top (see FIG. 3) to provide the first ferrule with access to the cavity prior to the cover 103 being put in place. The connector also comprises a first interface 302 on the periphery 303 of the cavity 301 to mate with a second interface 310 of the cover 103.

The module 100 also comprises an optical interconnect 110 comprising an optical conduit 104 with first and second ends 104a, 104b. The first end 104a is terminated by the first ferrule 102, which is disposed in a non-biased state in the cavity 301. The second end 104b of the optical interconnect is optically connected to an opto-electric device (OED) 120.

The module 100 also comprises the cover 103, which has the second interface 310, as mentioned above, and which defines an interior 105. The second interface coordinates/mates with the first interface such that the cover covers the opening to the cavity, thereby holding the first ferrule in the cavity between the cover and the connector in a "clam shell" arrangement.

A circuit board 150 is disposed in the interior 105 and has an electrical interface 170 configured to connect to a daughter card 160. Attached to the circuit board is the opto-electric device (OED) 120 which is electrically connected to the electrical interface and optically connected to the second end 104b of the optical interconnect 110.

These elements are described below in greater detail and with respect to selected alternative embodiments.

One aspect of the present invention is the simplification of the card connector of the module 100. By way of background, prior art card connectors, such as VITA 66.1 connectors, typically are configured with a biased ferrule to facilitate blind mate compatibility with a backplane connector. Such a configuration requires not only a spring to bias the ferrule, but also structure to accommodate the spring and provide for the axial movement of the ferrule. The module of the present invention eliminates the biased ferrule and its associated structure.

In one embodiment, the ferrule is held simply in a non-biased state in a clam-shell configuration between the connector 101 and the cover 103. In this embodiment, the connector and cover are attached by means of the first and second interfaces. The first and second interfaces may be any known mechanical interfaces including, for example, bore holes and fasteners, protrusions and receiving cavities, snaps, and surfaces adapted for adhesion/ultrasonic welding to each other. In the embodiment of FIG. 3, the first and second interfaces 302, 310 comprise cooperating first and second surfaces, 304, 305, a first threaded bore holes 306, second non-threaded bore holes 307, and threaded fasteners 308 which pass through the bore holes 307 and attach to bore holes 306 through threaded engagement to hold the first and second surfaces together and lock the first ferrule 102 in the cavity 301.

In one embodiment, the cavity 301 in the connector, is contoured to receive the first ferrule 102. For example, as shown in FIG. 3, the cavity has the contour of an MT ferrule to thereby position the MT ferrule within the connector. Additionally, to further enhance the mateability of the ferrule, a ferrule backer 330 is inserted behind the ferrule 102 to provide for angular misalignment of the ferrule. Specifically, the ferrule backer in this embodiment comprises a C-shaped member 331 to facilitate its disposition around the optical interconnect 104. The ferrule backer also comprises a convex forward face 332 to cooperate with a rearward face 102a of ferrule 102 such that angular movement between the ferrule backer and the ferrule is possible. The ferrule backer is disclosed, for example, in patent pending U.S. application Ser. No. 13/415,078, hereby incorporated by reference. Alternatively, the ferrule backer may have a convex rearward face which contacts a rear wall of the connector to provide for angulate misalignment. Such variations will be obvious to one of skill in the art in light of this disclosure.

It should be noted that although the embodiment of FIGS. 1-3 show a connector 101 having a single ferrule, multi-ferrule connector embodiments are possible. For example, two ferrule may be disposed one-over-the-other, or side-by-side in the connector. The ferrules may be disposed in individual cavities within the connector, or they may be disposed as a group in a larger cavity. Still other embodiments will be known to those of skill in the art in light of this disclosure.

Another aspect of the present invention is the simple cable management afforded by the module. Specifically, because the ferrule is not biased, there is no need to accommodate the axial movement of the ferrule by facilitating bending of the optical fibers. (Prior art cable assemblies typically involve routing bowed ribbon cable across the daughter card to discrete OEDs on the card to accommodate bending as the ferrule is pushed rearward.) In one embodiment, the optical interconnect disposed within the module is essentially straight from the first ferrule to the OED. Thus, this embodiment eliminates the mechanism for facilitating axial movement of the ferrule (e.g. spring, elongated cover, etc.) and the complexity of fiber routing to facilitate fiber bending to accommodate ferrule movement, thereby saving space and simplifying the assembly.

The optical interconnect 110 may comprise any known optical conduit 104 for transmitting optical signals, including, for example, optical fibers and waveguides. In one embodiment, the optical interconnect comprises fibers. In the particular embodiment of FIGS. 1-3, the optical fibers are packaged in an optical flex, in which the fibers are laminated to a flexible substrate to secure their relative positions. Such a configuration can be prepared precisely with very low tolerance to ensure repeatability among different modules. Additionally, by adhering the fibers to the flexible substrate, minimum bend radiuses are ensured. The use of optical flex is particularly advantages if a plurality of OEDs are used, thus requiring the fibers to be routed between the connector and different OEDs. The implementation of optical flex in the module of the present invention will be obvious to one of skill in the art in light of this disclosure.

It should be noted that, unlike prior art VPX configurations, the optical interconnect 110 does not have a bend/bow to accommodate ferrule movement. Rather, the optical interconnect 110 may be configured to directly connect the OED with the connector. In one embodiment, the optical interconnect is a ribbon cable which is essentially straight between the connector and the OED. Depending upon the application, it may be necessary to bend the ribbon slightly to accommodate different heights of the connector and OED as shown in FIG. 2. Bending the ribbon vertically, however, is readily achieved because of the relatively thin height of the ribbon (as opposed to bending the ribbon horizontally against its relatively thick width). Thus, bending the ribbon in the vertical direction imposes only minor bends on the fibers.

In yet another embodiment, the optical interconnect comprises waveguides integrated, at least partially, in the circuit board 150. In such a configuration, light bending optics and mode conditioning features may be used to interface the optical signals between the ferrule and the waveguides in the circuit board, and between the waveguides and the OED. Such an implementation will be obvious to one of skill in the art in light of this disclosure.

The connection of the optical interconnect to the OED can be effected in a number of ways which will be obvious to one of skill in the art in light of this disclosure. For example, in one embodiment, the second end 104b of the optical interconnect is terminated with a second ferrule 320 which is then optically coupled to the OED via a ferrule engagement mechanism 321, which is well known in the art.

In another embodiment, rather than terminating the optical interconnect with a second ferrule, a pigtail assembly can be used in which the optical interconnect is integral to the OED (see FIG. 2). More specifically, the OED may be prepared with fibers extending from it as is known in the art. These fibers may then be terminated with the first connector as described above. In this way, the second end of the optical interconnect is an integrated directly into the OED.

In yet another embodiment, the OED is optically coupled with waveguides in the circuit board. Still other approaches for optically coupling the optical interconnect to the OED will be known to one of skill in the art in light of this disclosure. Regardless of the termination to the OED, it should be appreciated that the straight configuration of the optical interconnect saves space in the module, which, in turn, saves space on the daughter card. It is well known that conserving space on daughter cards is highly desirable.

The ferrules used in the module present invention at the first and/or second end of the optical interconnect may be any known ferrule, either single or multi-fiber. In one embodiment, the ferrule is a multi-fiber ferrule such as an MT type ferrule, which is well known in the art. In the embodiment shown in FIGS. 1-4, the ferrule is a 12 fiber MT-type ferrule such as those used in MPO-type connectors. It should be understood, however, that other MT and non-MT type ferrules having different fiber counts can be used.

Figure 6:
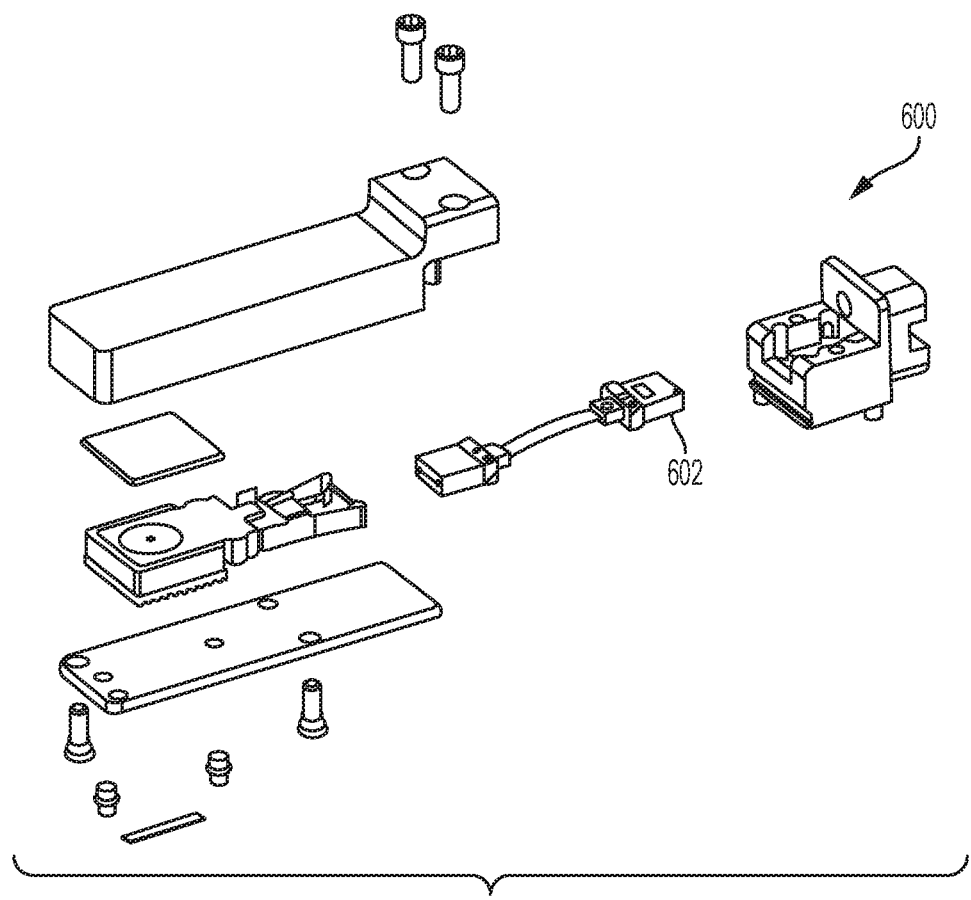
FIG. 6 shows an exploded view of an alternative embodiment of the module of FIG. 1.

While MT ferrule are illustrated in the figures, it should be understood that other ferrules may be used in connection with the present invention, including, for example, non-physical contact ferrules, such as lensed ferrules. For example, referring to FIG. 6, an embodiment of the module 600 of the present invention is shown with a lensed ferrule 602. It should be noted that module 600 is similar in most respects to module 100 shown in FIG. 3 except for the lensed ferrule 602 and the absence of a ferrule backer 330 (see FIG. 3). A ferrule backer is not generally required with a lensed ferrule because the lensing of the ferrule expands/focuses the beam thereby mitigating angular misalignment. Besides a lensed ferrule, it should be understood that other optics may be used between the ferrule and the mating connector, including, for example, ball lens(es), graded index fiber, index matching gels, or other optical component known for facilitating optical couplings.

In one embodiment, stresses along the optical interconnect are further reduced by attaching the circuit board to the cover such that the circuit board floats with respect to the cover. That is, rather than rigidly affixing the circuit board to the cover as is often done in prior art modules, in one embodiment of the present invention, the circuit board is able to float with respect to the cover. This may be advantageous if a connector is used which has tight tolerances for mating which make blind mating more difficult. Therefore, as the module is manipulated into position, or is otherwise subject to stresses—mechanical, thermal or otherwise—the circuit board within the cover is able to float independent of the cover, and therefore not transmit those forces to the OED which is mounted on the circuit board and thus, to the optical interconnect which is attached to the OED. Alternatively, if a connector type is used which has more relaxed tolerances for mating (for example, LGA), thereby making blind mating easier, it may not be necessary to have PCB float with respect to cover.

In one embodiment, the packing of the OED provides a heat transfer path to enable cooling the optical engines for reliable system operation and/or optimum performance. More specifically, referring to FIG. 3, a thermally conductive pad 340 is disposed between the OED 120 and the cover 103. In one embodiment, the cover 103 comprises a thermally conductive material to facilitate heat transfer from the pad 340 to ambient. Although FIGS. 1-4 depict just a single OED, it should be understood that the invention may be practiced with a plurality of OEDs. For example, referring to FIG. 5, module 500 has two OEDs 520 with an optical flex interconnect 504 optically coupling the OEDs to the ferrule 502. It should be noted that, in this embodiment, the ferrule cavity 301 (see FIG. 3) is not used. Rather, a more conventional mechanism is used in which a ferrule retainer 550 is disposed behind the ferrule and fastened to the connector 501 to secure the ferrule in place. As discussed above, this embodiment tends to be bulkier than that of FIGS. 1-3.

Figure 4:
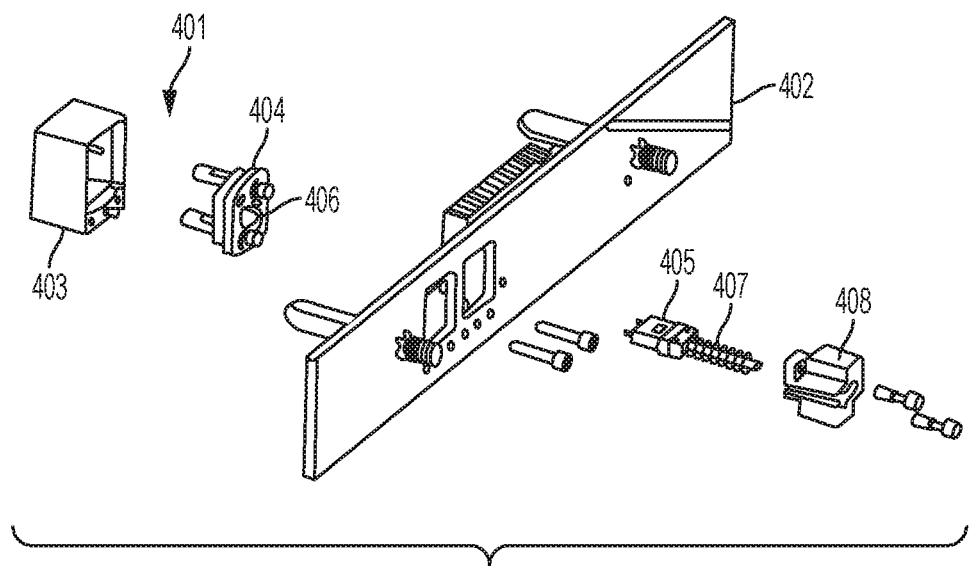
FIG. 4 shows an exploded view of one embodiment of the backplane connector of the present invention.
Figure 5:
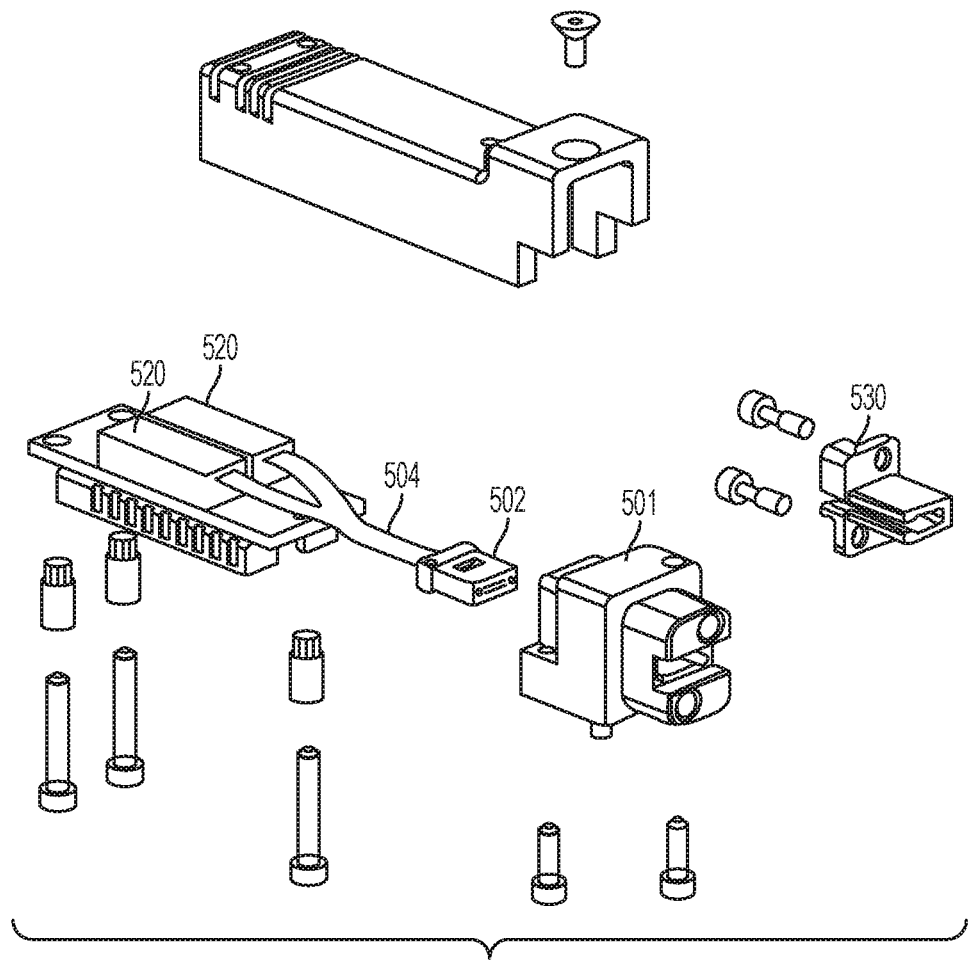
FIG. 5 shows and exploded view of one embodiment of the module of the present invention having two OEDs.

Referring to FIG. 4, an exploded view of the backplane 402 and backplane connector 401 is shown. As mentioned above, an important aspect of the invention is eliminating the biased ferrule from the daughter card and configuring the backplane connector with the biased ferrule instead. In one embodiment, the backplane connector 401 comprises an outer housing 403, an inner housing 404 received in the outer housing 403, a ferrule 405 received in an opening 406 of the inner housing 404, a spring 407 to bias the ferrule forward, and a ferrule retainer 408 behind the ferrule to retain the ferrule in the inner housing. Still other variations of this backplane connector configuration will be obvious to one of skill in the art in light of this disclosure.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. An opto-electric (OE) module having a front and back orientation and comprising:

a connector having a front end configured for mounting on an edge of a daughter card and for mating with a mating connector on a backplane, and a cavity rearward of said front end adapted to receive at least one first ferrule, an opening above said cavity to provide access for said first ferrule to said cavity, and a first interface on the periphery of said cavity to receive a second interface of a cover;

an optical interconnect with first and second ends, said first end being terminated by said first ferrule, said first ferrule being disposed in said cavity in a non-biased state, and said second end being optically coupled to at least one opto-electric device (OED);

said cover having said second interface and an interior, said second interface coordinating with said first interface such that said cover covers said cavity, thereby holding said first ferrule in said cavity between said cover and said connector;

a circuit board disposed in said interior and having an electrical interface configured to connect to said daughter card; and said OED attached to said circuit board and optically connected to said second end.

2. The module of claim 1, wherein said optical interconnect comprises one or more fibers.

3. The module of claim 2, wherein said optical interconnect comprises an optical flex circuit.

4. The module of claim 1, further comprising a ferrule backer disposed behind said first ferrule in said cavity, said ferrule backer having at least one convex surface facing forward to contact a rearward side of said first ferrule.

5. The module of claim 1, wherein said optical interconnect is not configured to bend to accommodate distance variations between said first ferrule and said OED.

6. The module of claim 5, wherein said optical interconnect is essentially straight horizontally between first ferrule and said OED.

7. The module of claim 1, wherein said second end of said optical interconnect is integrated with said OED.

8. The module of claim 1, wherein said second end is terminated by a second ferrule and said second ferrule is optically coupled to said OED.

9. The module of claim 8, wherein said first and second ferrules are held rigidly in position.

10. The module of claim 8, wherein said first and second ferrules are the same.

11. The module of claim 10, wherein said first and second ferrules are multi-fiber ferrules.

12. The module of claim 11, wherein said first and second ferrules are MT-type ferrules.

13. The module of claim 1, wherein said first ferrule is a lensed ferrule.

14. The module of claim 1, wherein said cavity is contoured to the shape of said first ferrule to hold said first ferrule rigidly in place.

15. The module of claim 1, wherein said first interface is upward facing.

16. The module of claim 1, wherein said connector complies with the slot spacing of VITA 66.4 connectors.

17. The module of claim 1, further comprising said daughter card and said backplane having said mating connector adapted to mate with said first ferrule, said mating connector comprising a backplane ferrule and a spring to bias said backplane ferrule forward.

18. An opto-electric (OE) module having a front and back orientation and comprising:

a connector having a front end configured to be disposed on a daughter card and to mate with a mating connector on a backplane;

an optical interconnect comprising an optical conduit with first and second ends, said first end being terminated by at least one first ferrule, said first ferrule being disposed in said connector in a non-biased state, and said second end being optically coupled to at least one opto-electric device (OED), wherein said optical interconnect is not configured to bend to accommodate distance variations between said first ferrule and said OED;

a cover being attached to said connector and having an interior;

a circuit board disposed in said interior and having an electrical interface configured to connect to said daughter card; and said opto-electric device (OED) attached to said circuit board and optically connected to said second end.

19. The module of claim 18, wherein said second end is terminated with a second ferrule, said first and second ferrules being the same.

20. The module of claim 19, wherein said first and second ferrules are MT ferrules.

21. The module of claim 18, wherein said second end is integrated with said OED.

22. A backplane system comprising:

a backplane comprising at least one backplane connector, said backplane connector comprising a backplane ferrule and a spring to bias said backplane ferrule forward; and at least one daughter card comprising at least one opto-electric (OE) module having a front and back orientation and comprising at least:

a connector disposed proximate an edge of said daughter card and having a front end configured to mate with said backplane connector;

an optical interconnect comprising an optical conduit with first and second ends, said first end being terminated by at least one first ferrule, said first ferrule being disposed in said connector in a non-biased state, and said second end being optically coupled to at least one opto-electric device (OED), wherein said optical interconnect is not configured to bend to accommodate distance variations between said first ferrule and said OED;

a cover being attached to said connector and having an interior;

a circuit board disposed in said interior and having an electrical interface configured to connect to said daughter card; and said opto-electric device (OED) attached to said circuit board and optically connected to said second end.

23. The backplane system of claim 22, wherein said at least one opto-electric (OE) module is configured to be blind-mated with said at least one backplane connector.

* * * * *